(12) United States Patent
Zhang et al.

(10) Patent No.: US 12,472,212 B2
(45) Date of Patent: Nov. 18, 2025

(54) LACTIPLANTIBACILLUS PLANTARUM GOLDGUT-LP618 HAVING FUNCTION OF RESISTING SALMONELLA INFECTION AND APPLICATION THEREOF

(71) Applicant: Shenzhen Porshealth Bioengineering Co., Ltd., Shenzhen (CN)

(72) Inventors: Silu Zhang, Shenzhen (CN); Yanyi Zheng, Shenzhen (CN); Guoxun Xiao, Shenzhen (CN); Xiaoli Zhou, Shenzhen (CN); Caijuan Lan, Shenzhen (CN); Yuebiao Feng, Shenzhen (CN); Tengxun Zhang, Shenzhen (CN); Xin Teng, Shenzhen (CN); Song Huang, Shenzhen (CN)

(73) Assignee: Shenzhen Porshealth Bioengineering Co., Ltd., Shenzhen (CN)

( * ) Notice: Subject to any disclaimer, the term of this patent is extended or adjusted under 35 U.S.C. 154(b) by 0 days.

(21) Appl. No.: 18/938,752

(22) Filed: Nov. 6, 2024

(65) Prior Publication Data
US 2025/0073282 A1    Mar. 6, 2025

(30) Foreign Application Priority Data
Nov. 7, 2023   (CN) .......................... 202311477561.6

(51) Int. Cl.
| | | |
|---|---|---|
| A61K 35/742 | (2015.01) | |
| A61P 31/04 | (2006.01) | |
| C12N 1/20 | (2006.01) | |
| C12R 1/25 | (2006.01) | |

(52) U.S. Cl.
CPC ............ *A61K 35/742* (2013.01); *A61P 31/04* (2018.01); *C12N 1/205* (2021.05); *C12R 2001/25* (2021.05)

(58) Field of Classification Search
None
See application file for complete search history.

(56) References Cited

U.S. PATENT DOCUMENTS

| | | |
|---|---|---|
| 2023/0210922 A1 | 7/2023 | Yung-Hsiang et al. |
| 2023/0405064 A1 | 12/2023 | Kim et al. |
| 2024/0016864 A1 | 1/2024 | Lin et al. |

OTHER PUBLICATIONS

Smith, Emma. Halting the Spread of *Salmonella*, Oct. 12, 2018. https://www.ovg.ox.ac.uk/news/halting-the-spread-of-salmonella retrieved on Sep. 17, 2023.*
CNIPA, Notification of First Office Action for Chinese application CN202311477561.6, May 12, 2024.
CNIPA, Notification to grant patent right for Chinese application CN202311477561.6, Jul. 2, 2024.

* cited by examiner

*Primary Examiner* — Oluwatosin A Ogunbiyi
(74) *Attorney, Agent, or Firm* — Zhigang Ma (57) ABSTRACT

The present invention relates to the technical field of probiotics, in particular to a Lactiplantibacillus *plantarum* GOLDGUT-LP618 having a function of resisting *Salmonella* infection and application thereof. The Lactiplantibacillus *plantarum* GOLDGUT-LP618 provided by the present invention is preserved in China General Microbiological Culture Collection Center, with the preservation number of CGMCC No. 28399. The strain has high resistance to acid and bile salt and can adapt to the digestive tract environment. The strain can inhibit *Salmonella* infection, relieve diarrhea, inflammation and intestinal damage caused by *Salmonella* infection, and promote intestinal health. The strain can be used for preparing functional foods, dietary supplements or drugs that can resist *Salmonella* infection and improve diarrhea and inflammation caused by *Salmonella* infection, and has good application prospects.

1 Claim, 12 Drawing Sheets
Specification includes a Sequence Listing.

SEQUENCE LISTING

```
Sequence total quantity: 1
SEQ ID NO: 1             moltype = DNA   length = 1436
FEATURE                  Location/Qualifiers
source                   1..1436
                         mol_type = genomic DNA
                         note = Lactiplantibacillus plantarum
                         organism = Lactobacillus sp.
SEQUENCE: 1
tgcaagtcga acgaactctg gtattgattg gtgcttgcat catgatttac atttgagtga   60
gtggcgaact ggtgagtaac acgtgggaaa cctgcccaga agcgggggat aacacctgga  120
aacagatgct aataccgcat aacaacttgg accgcatggt ccgagcttga aagatggctt  180
cggctatcac ttttggatgg tcccgcggcg tattagctag atggtggggt aacggctcac  240
catggcaatg atacgtagcc gacctgagag ggtaatcggc cacattggga ctgagacacg  300
gcccaaactc ctacgggagg cagcagtagg gaatcttcca caatggacga aagtctgatg  360
gagcaacgcc gcgtgagtga agaagggttt cggctcgtaa aactctgttg ttaaagaaga  420
acatatctga gagtaactgt tcaggtattg acggtattta accagaaagc cacggctaac  480
tacgtgccag cagccgcggt aatacgtagg tggcaagcgt tgtccggatt tattgggcgt  540
aaagcgagcg caggcggttt tttaagtctg atgtgaaagc cttcggctca accgaagaag  600
tgcatcggaa actgggaaac ttgagtgcag aagaggacag tggaactcca tgtgtagcgg  660
tgaaatgcgt agatatatgg aagaacacca gtggcgaagg cggctgtctg gtctgtaact  720
gacgctgagg ctcgaaagta tgggtagcaa acaggattag ataccctggt agtccatacc  780
gtaaacgatg aatgctaagt gttggagggt ttccgccctt cagtgctgca gctaacgcat  840
taagcattcc gcctggggag tacggccgca aggctgaaac tcaaaggaat tgacgggggc  900
ccgcacaagc ggtggagcat gtggtttaat tcgaagctac gcgaagaacc ttaccaggtc  960
ttgacatact atgcaaatct aagagattag acgttccctt cggggacatg gatacaggtg 1020
gtgcatggtt gtcgtcagct cgtgtcgtga gatgttgggt taagtcccgc aacgagcgca 1080
acccttatta tcagttgcca gcattaagtt gggcactctg gtgagactgc cggtgacaaa 1140
ccggaggaag gtggggatga cgtcaaatca tcatgcccct tatgacctgg gctacacacg 1200
tgctacaatg gatggtacaa cgagttgcga actcgcgaga gtaagctaat ctcttaaagc 1260
cattctcagt tcggattgta ggctgcaact cgcctacatg aagtcggaat cgctagtaat 1320
cgcggatcag catgccgcgg tgaatacgtt cccgggcctt gtacacaccg cccgtcacac 1380
catgagagtt tgtaacaccc aaagtcggtg gggtaacctt ttaggaacca gccgcc      1436
```

LACTIPLANTIBACILLUS PLANTARUM GOLDGUT-LP618 HAVING FUNCTION OF RESISTING SALMONELLA INFECTION AND APPLICATION THEREOF

SEQUENCE LISTING

The sequence listing is submitted as a XML file filed via EFS-Web, with a file name of "Sequence_Listing.XML", a creation date of Nov. 11, 2024, and a size of 3,810 bytes. The sequence Listing filed via EFS-Web is a part of the specification and is incorporated in its entirety by reference herein.

TECHNICAL FIELD

The present invention relates to the technical field of probiotics, in particular to a Lactiplantibacillus *plantarum* GOLDGUT-LP618 having a function of resisting *Salmonella* infection and application thereof.

BACKGROUND

Bacterial food poisoning is one of the major types of many foodborne diseases caused by accidental ingestion of food containing toxic or harmful substances or pathogens. *Salmonella* belongs to Enterobacteriaceae, and is an important contaminating bacterium of food such as eggs, meat and milk and water sources, as well as an important foodborne pathogen. According to the *Salmonella* serotype, virulence of strains, dose of infection and individual immune statuses, ingestion of *Salmonella* contaminated food may cause infection of different severities. Generally, patients have symptoms of fever, acute gastroenteritis, abdominal pain, diarrhea, nausea and vomiting, wherein dehydration and fluid loss caused by severe diarrhea are the main reason for death of the patients. Although most *Salmonella* infections can be self-healed, pharmacotherapy is necessary for patients with severe diarrhea. Supporting therapy with electrolyte supplementation and antibiotic pathogen removal therapy are common treatment modes, but the antibiotic therapy is limited because *Salmonella* may become resistant to the most commonly used antibiotics. In addition, the imbalance of intestinal flora caused by the antibiotic treatment can further lead to acute diarrhea. Since there is currently no effective oral vaccine to prevent *Salmonella* infection, probiotics that colonize the gut have been gradually regarded as an optional alternative solution. The probiotics can occupy the intestinal niche, maintain the stability of intestinal flora, enhance the immunity, and play an important role in preventing and inhibiting *Salmonella* infection.

Although some strains have the effects of preventing and alleviating *Salmonella* infection in humans or animals, the functions of the strains are designed based on a prevention model of *Salmonella* infection, which means that the host needs to colonize the probiotics before *Salmonella* infection. Occasional *Salmonella* infection is often not known in advance, so it is necessary to screen a probiotic, taken after *Salmonella* infection, which achieves the effects of resisting *Salmonella* infection, e.g., relieving diarrhea symptoms and reducing inflammatory reaction.

SUMMARY

The present invention provides a Lactiplantibacillus *plantarum* GOLDGUT-LP618 having a function of resisting *Salmonella* infection and application thereof.

The present invention conducts isolation from the intestinal tract of healthy human bodies to obtain a strain of Lactiplantibacillus *plantarum*. It has been proved that the strain has good resistance to stomach acid and bile salt, can produce short-chain fatty acid in vitro, and has strong in vitro inhibitory properties of *Salmonella* growth; and the strain can inhibit *Salmonella* infection, treat diarrhea and inflammation caused by *Salmonella* infection, and regulate intestinal health. The strain is administered after *Salmonella* infection in mice, which can promote the production of short-chain fatty acid in vivo, reduce inflammatory reaction, relieve diarrhea symptoms and play a role in resisting *Salmonella* infection, thereby providing a basis for the development of drugs that can inhibit *Salmonella*, improve diarrhea and inflammation, and promote intestinal health.

Specifically, the present invention provides the following technical solution:

The present invention provides a Lactiplantibacillus *plantarum* GOLDGUT-LP618. The strain was preserved in China General Microbiological Culture Collection Center (CGMCC for short, at Institute of Microbiology, Chinese Academy of Sciences, No. 3, Yard 1, Beichen West Road, Chaoyang District, Beijing, postcode: 100101) on Sep. 8, 2023, with the classified name of Lactiplantibacillus *plantarum* and the preservation number of CGMCC No. 28399.

The Lactiplantibacillus *plantarum* GOLDGUT-LP618 is isolated from the intestinal tract of a healthy human body, and is identified by bacterial morphology, physiology and 16S rDNA sequencing. The result is Lactiplantibacillus *plantarum*, named Lactiplantibacillus *plantarum* GOLDGUT-LP618.

The Lactiplantibacillus *plantarum* GOLDGUT-LP618 has the following microbiological characteristics:

(1) Morphological Features

Gram stain is positive. After 24 h culture in an MRS solid medium, colonies are small, milky white, round, raised and smooth.

(2) Physiological Characteristics

The Lactiplantibacillus *plantarum* GOLDGUT-LP618 can grow well in the environment of artificial stomach acid and bile salt, has good resistance to stomach acid and bile salt, has a strong inhibitory effect on the growth of *Salmonella*, and can effectively treat diarrhea caused by *Salmonella* infection in animal experiments.

The Lactiplantibacillus *plantarum* GOLDGUT-LP618 can be cultured by the following method: inoculating the strain in the medium and culturing at 37° C. for 24 h. The medium can adopt the conventional medium in the field, which can enable the Lactiplantibacillus *plantarum* GOLDGUT-LP618 to grow; and preferably adopts an MRS broth medium. The formula of the MRS broth medium is as follows: 10.0 g/L of casease digest, 10.0 g/L of beef powder, 4.0 g/L of yeast powder, 2.0 g/L of triammonium citrate, 5.0 g/L of sodium acetate, 0.2 g/L of magnesium sulfate, 0.05 g/L of manganese sulfate, 20.0 g/L of glucose, 2.0 g/L of dipotassium hydrogen phosphate and 1.0 g/L of Twain 80, with pH=5.7±0.2, and 1.5% agar is added to the solid medium.

After safety evaluation, the results of virulence gene analysis show that the Lactiplantibacillus *plantarum* GOLDGUT-LP618 does not contain virulence factors. The results of antibiotic resistance tests show that the strain does not contain transferable antibiotic resistance genes. The results of animal toxicity experiments show that the behavior and mental condition of mice are good. The strain belongs to an actual non-toxic level.

The present invention provides a microbial preparation comprising the Lactiplantibacillus plantarum GOLDGUT-LP618.

Preferably, in the microbial preparation, the Lactiplantibacillus plantarum GOLDGUT-LP618 is present in the form of live bacteria.

The above microbial preparation may be a solid preparation (such as bacterial powder) or a liquid preparation (such as emulsion preparation).

The present invention provides a preparation method of the above microbial preparation, comprising a step for culturing the Lactiplantibacillus plantarum GOLDGUT-LP618.

Preferably, the culture is conducted at 35-37° C.

Preferably, the culture is conducted in a liquid medium to obtain a bacteria solution.

The above bacteria solution may be prepared into a liquid preparation directly or by concentrating and/or adding other excipients, or prepared into a solid preparation by drying, or prepared into a solid preparation by separating bacterial bodies in the bacteria solution and then preparing the bacterial bodies.

Based on the function of the Lactiplantibacillus plantarum GOLDGUT-LP618, the present invention provides the following application of the strain:

The present invention provides an application of the Lactiplantibacillus plantarum GOLDGUT-LP618 or the microbial preparation in preparation of a product for resisting Salmonella infection.

The present invention provides an application of the Lactiplantibacillus plantarum GOLDGUT-LP618 or the microbial preparation in inhibition of Salmonella for non-disease therapeutic purposes.

The inhibition of Salmonella for non-disease therapeutic purposes comprises the inhibition of Salmonella in the in vitro environment (such as food, etc.).

The present invention provides an application of the Lactiplantibacillus plantarum GOLDGUT-LP618 or the microbial preparation in the preparation of products for preventing, relieving or treating diarrhea, inflammation and/or intestinal damage caused by Salmonella infection.

In the application for relieving or treating diarrhea, inflammation and/or intestinal damage caused by Salmonella infection, the product can be administered to subjects infected with Salmonella after Salmonella infection.

In the present invention, the Salmonella comprises but is not limited to Salmonella typhimurium, Salmonella enterica, etc.

The present invention provides an application of the Lactiplantibacillus plantarum GOLDGUT-LP618 or the microbial preparation in the preparation of products for increasing the content of intestinal short-chain fatty acid and/or improving intestinal health.

In the above application, the product is a drug.

The present invention further provides an application of the Lactiplantibacillus plantarum GOLDGUT-LP618 or the microbial preparation in the preparation of a drug.

The present invention provides a product comprising the Lactiplantibacillus plantarum GOLDGUT-LP618 or the microbial preparation; and the product is a drug.

In addition to comprising the Lactiplantibacillus plantarum GOLDGUT-LP618 or the microbial preparation, the drug may also comprise ingredients (e.g., fillers, excipients, lubricants, wetting agents, diluents, etc.) permitted in the field of pharmacy. The preparation type of the drug may be a solid preparation (e.g. powder, granule, capsule, tablet, etc.) or a liquid preparation (e.g. oral liquid, etc.).

Compared with the prior art, the beneficial effects of the technical solution provided by the present invention include at least:

The Lactiplantibacillus plantarum GOLDGUT-LP618 provided by the present invention has high acid resistance and bile salt resistance, and thus can adapt to the digestive tract environment. The Lactiplantibacillus plantarum GOLDGUT-LP618 has good bacteriostatic effect on Salmonella, inhibits Salmonella infection, treats diarrhea, inflammation and intestinal damage caused by Salmonella infection, promotes intestinal health, can be used for preparing drugs for resisting Salmonella infection, relieving diarrhea and inflammation caused by Salmonella infection and promoting intestinal health, and has good application prospects in the fields of resisting Salmonella infection and improving intestinal health.

DESCRIPTION OF DRAWINGS

To more clearly describe the technical solutions in the present invention or in the prior art, the drawings required to be used in the description of the embodiments or the prior art will be simply presented below. Obviously, the drawings in the following description are some embodiments of the present invention, and for those ordinary skilled in the art, other drawings can also be obtained according to these drawings without contributing creative labor.

In FIGS. 7-12, NC represents a blank control group, STMC represents a model group, POS represents a positive drug group, and LP618 represents a probiotic treatment group.

DETAILED DESCRIPTION

To make purposes, technical solutions and advantages of the present invention more clear, the technical solutions in the present invention will be clearly and fully described below in combination with the drawings in the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

*Salmonella enterica* subsp. *Enterica* BNCC292614 is used in the following embodiment, and purchased from BeNa Culture Collection.

Embodiment 1 Isolation and Identification of Lactiplantibacillus *plantarum* GOLDGUT-LP618

1. Isolation of Lactiplantibacillus *plantarum* GOLDGUT-LP618
1.1 Sample Source
Lactiplantibacillus *plantarum* GOLDGUT-LP618 is isolated from a healthy human gut.

1.2 Preparation of Medium
The medium used for sample isolation and strain screening is an MRS solid medium. The formula of an MRS liquid medium is as follows: 10.0 g/L of casease digest, 10.0 g/L of beef powder, 4.0 g/L of yeast powder, 2.0 g/L of triammonium citrate, 5.0 g/L of sodium acetate, 0.2 g/L of magnesium sulfate, 0.05 g/L of manganese sulfate, 20.0 g/L of glucose, 2.0 g/L of dipotassium hydrogen phosphate, and 1.0 g/L of Twain-80, and 1.5% agar is added to prepare the MRS solid medium, with pH=5.7±0.2.

1.3 Isolation of Strains
1 g of sample was put into 10 mL of MRS liquid medium, mixed evenly and then cultured at 37° C.; the enrichment solution after culture was absorbed for 10-fold gradient dilution; 100 μL of bacteria solution with $10^{-5}$, $10^{-6}$ and $10^{-7}$ dilution gradients was selected and coated on a petri dish containing the sterile MRS solid medium, and subjected to stationary culture at 37° C. under aerobic conditions for 24-48 h; and after obvious single colonies were formed, typical colonies were selected, and scribed and purified on the MRS solid plate medium for several times until the morphologies of colonies on the whole plate were consistent; and the cultures were identified by strains.

Figure 1:
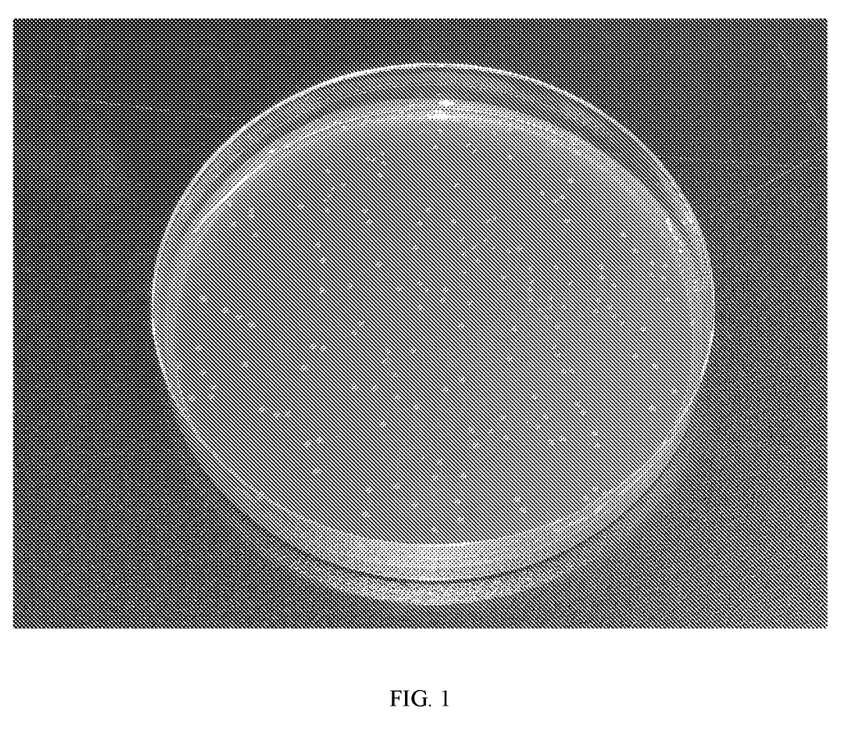
FIG. 1 shows the colony morphology of Lactiplantibacillus plantarum GOLDGUT-LP618 in embodiment 1 of the present invention.

2. Identification of Lactiplantibacillus *plantarum* GOLDGUT-LP618
2.1 Colony Features
After the Lactiplantibacillus *plantarum* GOLDGUT-LP618 was cultured in the MRS solid medium for 24 h, the colonies were small, milky white, round, raised and smooth, as shown in FIG. 1.

Figure 2:
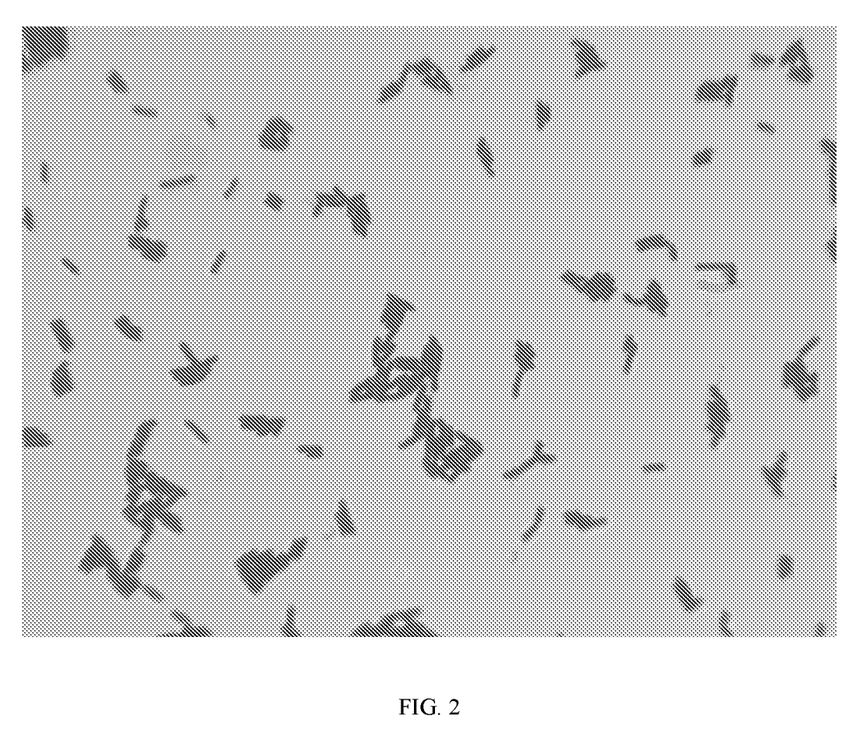
FIG. 2 shows the gram staining diagram of Lactiplantibacillus plantarum GOLDGUT-LP618 in embodiment 1 of the present invention with a magnification of 1000 times.

2.2 Microscopic Morphology
Colony smear of Lactiplantibacillus *plantarum* GOLDGUT-LP618: the gram stain is positive; bacteria are rod-shaped and arranged in single, pair or chain, as shown in FIG. 2.

2.3 16S rDNA Identification
Identification company: Tsingke Biotechnology Co., Ltd.
Identification sequence: as shown in SEQ ID NO. 1.
Identification results: According to the sequence comparison results and physiological and biochemical results of the strain, the strain was determined to be Lactiplantibacillus *plantarum*.

Embodiment 2 Test of Gastric Acid Resistance of Lactiplantibacillus *plantarum* GOLDGUT-LP618

Figure 3:
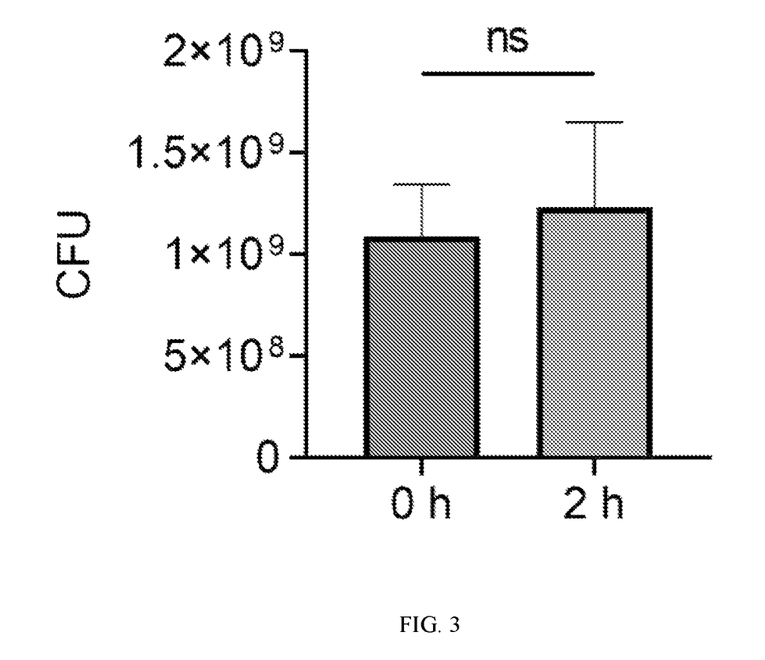
FIG. 3 shows the CFU counting results before and after acid-resistant culture of Lactiplantibacillus plantarum GOLDGUT-LP618 in embodiment 2 of the present invention; the data are from three repeated experiments; the error line represents the standard deviation; a statistical analysis method is t test; and ns represents that p value is greater than 0.05.

The overall pH condition of the human stomach environment is strongly acidic, so the acid resistance of the strain is an important index to evaluate whether the strain can survive and colonize in the stomach acid environment. Artificial gastric juice was used to simulate the gastric environment. 100 mL of prepared artificial gastric juice reserve was taken, 1.9 mL of IM hydrochloric acid was added to the artificial gastric juice, and a bottle of digestive enzyme was added to obtain the simulated gastric juice. After 4 mL of Lactiplantibacillus *plantarum* GOLDGUT-LP618 bacteria solution was washed and resuspended with PBS, 4 mL of simulated gastric juice was added, blown, mixed evenly and co-incubated anaerobically for 2 h at 37° C. The bacteria solution before (0 h) and after (2 h) incubation of the simulated gastric juice was gradiently diluted to $10^{-5}$. Three concentrations of $10^{-3}$, $10^{-4}$ and $10^{-5}$ were taken, and the diluent was coated on the MRS agar plate. After anaerobic culture at 37° C. for 48 h, colony count was performed. It can be seen from FIG. 3 that after the incubation and culture of the simulated gastric juice, the viable count of Lactiplantibacillus *plantarum* GOLDGUT-LP618 is not decreased, which indicates that the strain has good gastric acid resistance.

Embodiment 3 Test of Bile Salt Resistance of Lactiplantibacillus *plantarum* GOLDGUT-LP618

Figure 4:
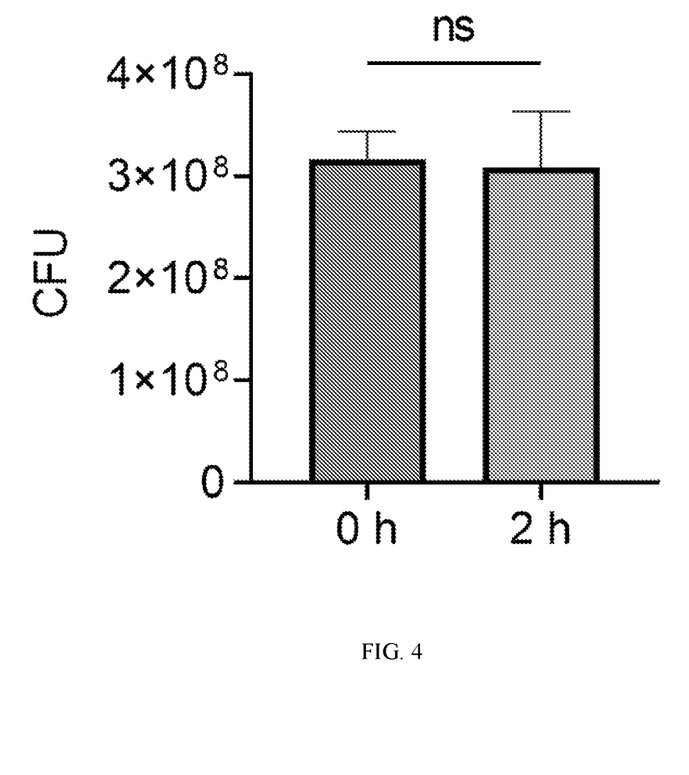
FIG. 4 shows the CFU counting results before and after incubation and culture of simulated intestinal fluid of Lactiplantibacillus plantarum GOLDGUT-LP618 in embodiment 3 of the present invention; the data are from three repeated experiments; the error line represents the standard deviation; a statistical analysis method is t test; and ns represents that p value is greater than 0.05.

The bile salt resistance of the strain was tested by simulated intestinal fluid. 100 mL of prepared artificial intestinal fluid reserve was taken, and 1 bottle of digestive enzyme was added and mixed evenly to obtain simulated intestinal fluid. After 4 mL of Lactiplantibacillus *plantarum* GOLDGUT-LP618 bacteria solution was washed and resuspended with PBS, 4 mL of simulated intestinal fluid was added, blown, mixed evenly and co-incubated anaerobically for 2 h at 37° C. The bacteria solution before (0 h) and after (2 h) incubation was gradiently diluted to $10^{-5}$. Three concentrations of $10^{-3}$, $10^{-4}$ and $10^{-5}$ were taken, and the diluent was coated on the MRS agar plate. After anaerobic culture at 37° C. for 48 h, colony count was performed. It can be seen from FIG. 4 that after the incubation and culture of the simulated intestinal fluid, the viable count of Lactiplantibacillus *plantarum* GOLDGUT-LP618 is not decreased, which indicates that the strain has good bile salt resistance.

Embodiment 4 Test of In Vitro Antibacterial Ability of Lactiplantibacillus *plantarum* GOLDGUT-LP618

The Lactiplantibacillus *plantarum* GOLDGUT-LP618 was transferred into a fresh MRS medium at an inoculation rate of 2% (v/v), subjected to anaerobic culture at 37° C. for 48 h, and centrifuged at 4000 rpm for 10 min. The supernatant was filtered by a 0.22 μm filter membrane and sterilized for later use.

*Salmonella enterica* subsp. *Enterica* was transferred into a fresh LB medium at an inoculation rate of 2%. After the OD value of the cultured bacteria solution was adjusted to 1.6 by an LB medium, 100 μL of *Salmonella* solution was taken, added to 100 mL of LB solid medium which was sterilized and cooled to 50° C., then mixed evenly and poured onto a plate. After the medium in the plate is solidified, the plate was punched by a hole puncher, and the distance of hole centers was not less than 25 mm. 200 μL of filtered and sterilized supernatant of Lactiplantibacillus *plantarum* GOLDGUT-LP618 was added. The samples were naturally diffused at 4° C. for 3 h, and then cultured at 37° C. overnight for 24-48 h. The diameter of an inhibition zone was measured. The MRS medium was used as negative control and ampicillin (25 μg/mL) was used as positive control.

Figure 5:
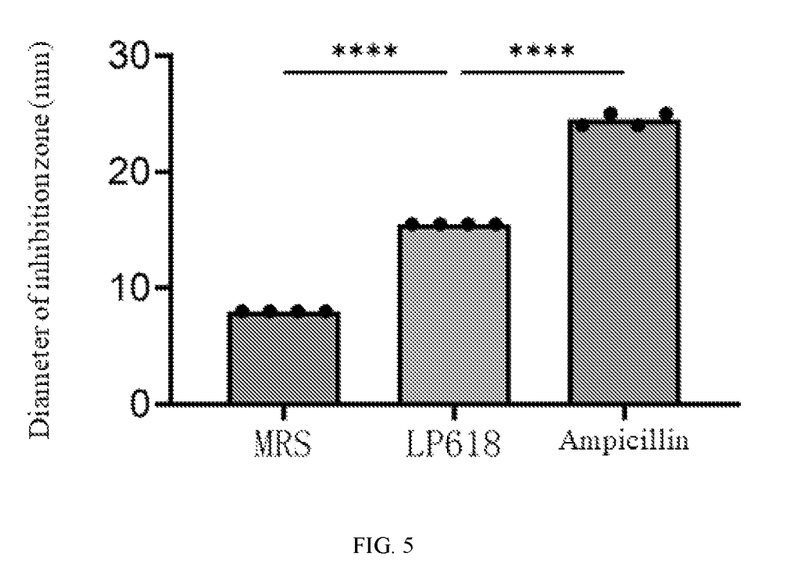
FIG. 5 shows the detection results of the inhibition ability of the supernatant of Lactiplantibacillus plantarum GOLDGUT-LP618 to the growth of Salmonella in embodiment 4 of the present invention, wherein MRS represents negative control and LP618 represents Lactiplantibacillus plantarum GOLDGUT-LP618: the data are from four repeated experiments; the error line represents the standard deviation; a statistical analysis method is ANOVA; and **** represents that p value is less than 0.0001.

It can be seen from FIG. 5 that the supernatant of the Lactiplantibacillus *plantarum* GOLDGUT-LP618 can effectively inhibit the growth of *Salmonella*.

Embodiment 5 Determination of Acid Production Ability of Lactiplantibacillus *plantarum* GOLDGUT-LP618

The Lactiplantibacillus *plantarum* GOLDGUT-LP618 was transferred into a fresh MRS medium at an inoculation rate of 4% (v/v), subjected to anaerobic culture at 37° C. for 24 h, and centrifuged at 4000 rpm for 10 min. The supernatant was taken. The content of short-chain fatty acid in the supernatant was determined by an HPLC method. A control strain was a Lactiplantibacillus *plantarum* with low acid production obtained in this screening experiment.

Figure 6:
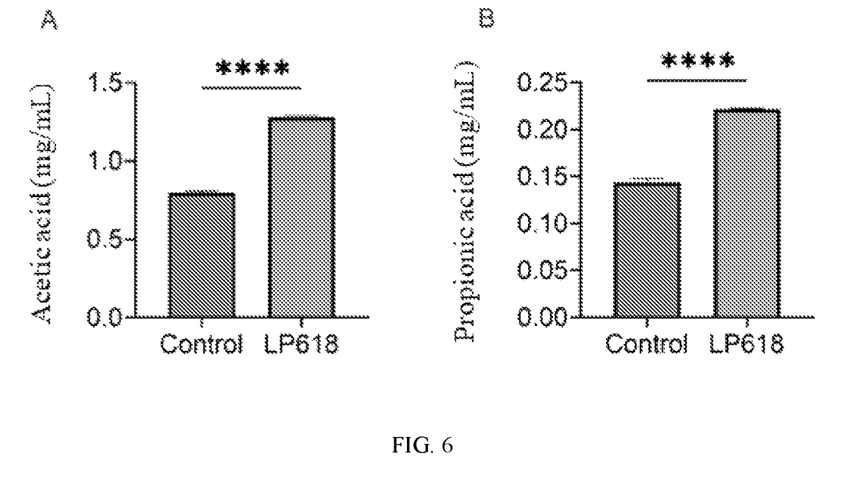
FIG. 6 shows the concentration detection results of acetic acid (A) and propionic acid (B) in the supernatant of Lactiplantibacillus plantarum GOLDGUT-LP618 in embodiment 5 of the present invention, wherein Control represents a control strain; the data are from three repeated experiments; the error line represents the standard deviation; a statistical analysis method is t test; and **** represents that p value is less than 0.0001.

It can be seen from FIG. 6 that the Lactiplantibacillus *plantarum* GOLDGUT-LP618 has high production ability of acetic acid and propionic acid.

Embodiment 6 Improvement of Diarrhea Symptoms in Mice Infected with *Salmonella* by Lactiplantibacillus *plantarum* GOLDGUT-LP618

To assess the ability of Lactiplantibacillus *plantarum* GOLDGUT-LP618 to resist *Salmonella* infection in vivo, a diarrhea model of mice infected with *Salmonella typhimurium* was used. After one week of adaptive feeding. 6-week-old male BALB/c mice at SPF level were fed with 5 mg/mL streptomycin water for two days, and then fed with normal water and food for one day. After fasting and water deprivation for 4 h, each mouse was gavaged with 100 μL of 5% sodium bicarbonate solution, and then each mouse was gavaged with $2 \times 10^8$ CFU *Salmonella typhimurium* and continuously gavaged with *Salmonella typhimurium* for three days to induce diarrhea. The mice with diarrhea induced by gavaging with *Salmonella typhimurium* were divided into three groups. In a model group (STMC group), each mouse was gavaged with 200 μL of normal saline daily. In a positive drug group (POS group), each mouse was gavaged with 200 μL of levofloxacin solution daily, and the dose was 8 mg/kg. In a probiotic treatment group (LP618 group), each mouse was gavaged with 200 μL of bacteria solution of Lactiplantibacillus *plantarum* GOLDGUT-LP618 daily, and the viable count was $5 \times 10^8$ CFU per mouse. Continuous gavage intervention was performed for 5 days. The mice in a blank control group (NC group) were not gavaged with *Salmonella typhimurium* and modeled, but gavaged with the same amount of normal saline daily as control.

Figure 7:
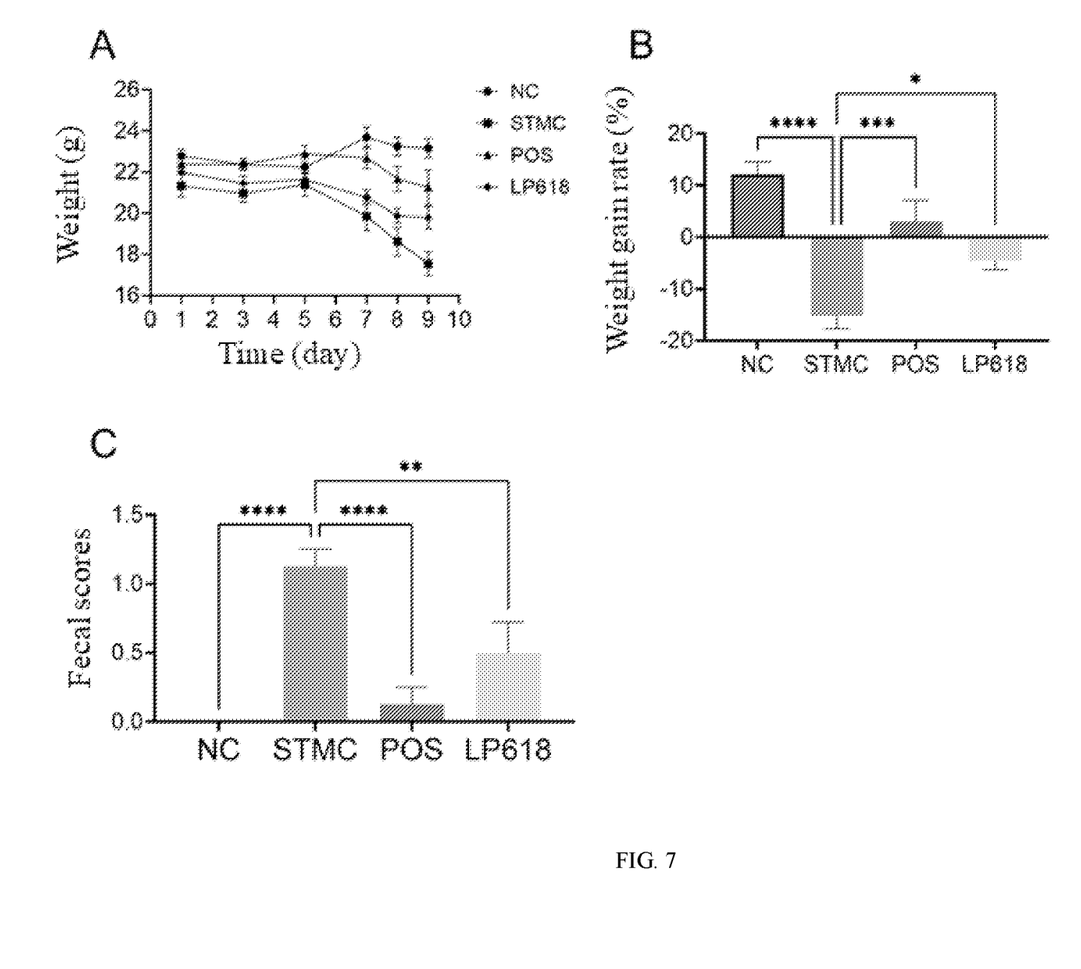
FIG. 7 shows a weight change curve (A), a weight gain rate (B) and a fecal score (C) of mice in embodiment 6 of the present invention; the error line represents the standard deviation; a statistical analysis method is a one-way ANOVA; * represents that p value is less than 0.05;  represents that p value is less than 0.01; * represents that p value is less than 0.001; and **** represents that p value is less than 0.0001.

A in FIG. 7 shows weight changes in the four groups of mice during modeling and intervention. The weight of the mice in the model group is decreased significantly, and the weight of the mice in the positive drug group and the probiotic treatment group are decreased slowly. After the intervention of positive drugs and probiotics, the weight gain rate of the mice is decreased significantly more slowly than that of the model group (B in FIG. 7).

During the intervention, the diarrhea status of the mice was assessed in the form of fecal scores by observing the defecation status of the mice. A score of 0 indicates normal stool; a score of 1 indicates mild diarrhea; and a score of 2 indicates moderate diarrhea. It can be seen from C in FIG. 7 that the mice in the blank control group have no diarrhea, and the mice in the model group have diarrhea of different degrees. After the intervention of the positive drugs, the diarrhea status of the mice is significantly improved, and the diarrhea symptom of the mice after the intervention of Lactiplantibacillus *plantarum* GOLDGUT-LP618 is also significantly improved.

Embodiment 7 Reduction of Inflammatory Reaction of Mice Infected with *Salmonella* by Lactiplantibacillus *plantarum* GOLDGUT-LP618

Figure 8:
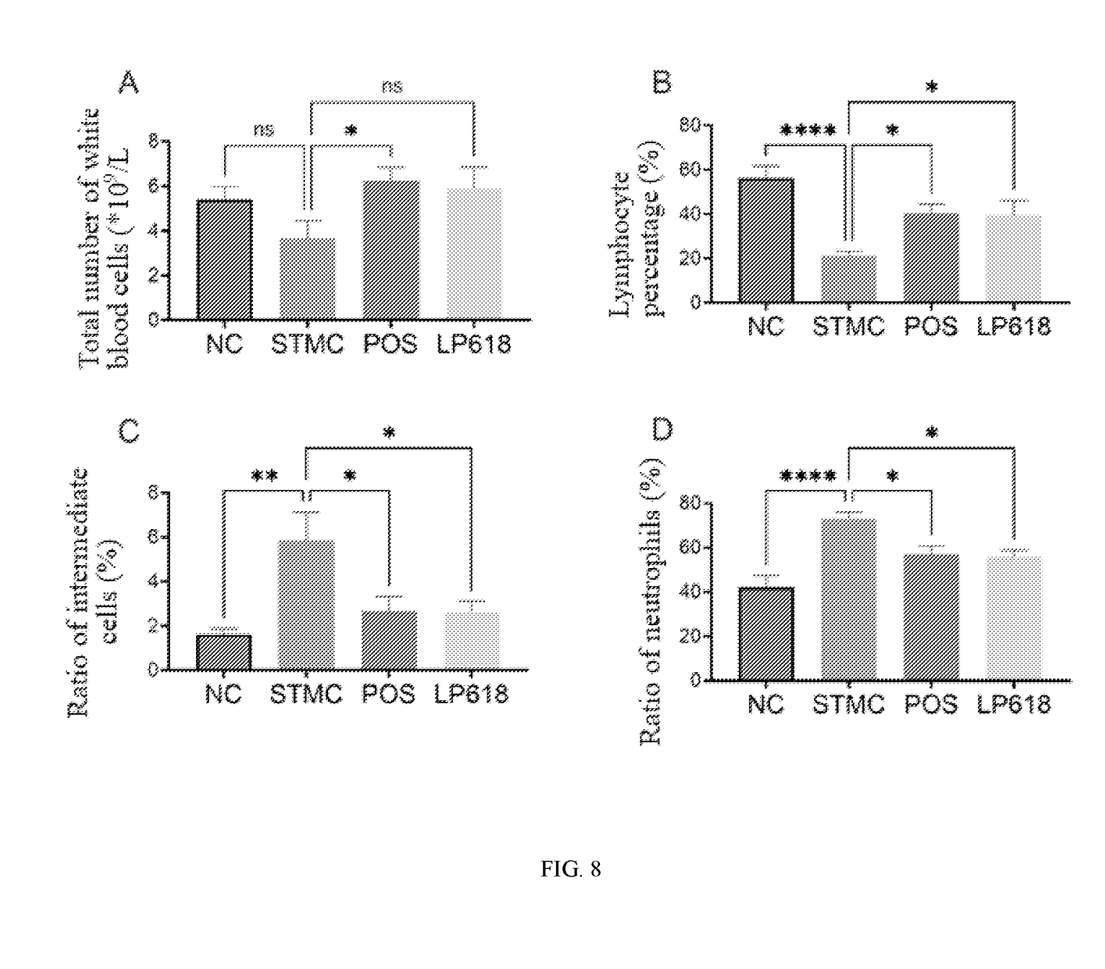
FIG. 8 shows the detection results of the number of blood immune cells in mice in embodiment 7 of the present invention; the error line represents the standard deviation; a statistical analysis method is a one-way ANOVA; ns represents that p value is greater than 0.05; * represents that p value is less than 0.05;  represents that p value is less than 0.01; and ** represents that p value is less than 0.0001.

To assess the inflammatory reaction of *Salmonella typhimurium* to the intestinal tract of the mice, the blood of the mice was taken for blood routine analysis. In case of bacterial infection, the number of white blood cells and lymphocytes is decreased and the number of neutrophils and intermediate cells is increased. It can be seen from FIG. 8 that compared with the NC group, after the mice of the STMC group are infected with *Salmonella typhimurium*, the total number of white blood cells is decreased, the ratio of lymphocytes is significantly decreased, and the number of neutrophils and the ratio of intermediate cells are significantly increased, which indicates that the mice have the inflammatory reaction due to the infection by *Salmonella typhimurium*. After the intervention of the positive drugs, the total number of white blood cells and the ratio of lymphocytes are increased significantly, and the ratio of intermediate cells and neutrophils are decreased significantly, which indicates that the inflammatory reaction caused by *Salmonella* is alleviated. Similarly, after the intervention of Lactiplantibacillus *plantarum* GOLDGUT-LP618, the ratio of lymphocytes is increased significantly, the ratio of intermediate cells and the ratio of neutrophils are decreased significantly; and the total number of white blood cells is increased but not significantly. This indicates that the inflammation caused by *Salmonella* infection is controlled to a certain extent after gavaging with Lactiplantibacillus *plantarum* GOLDGUT-LP618.

Figure 9:
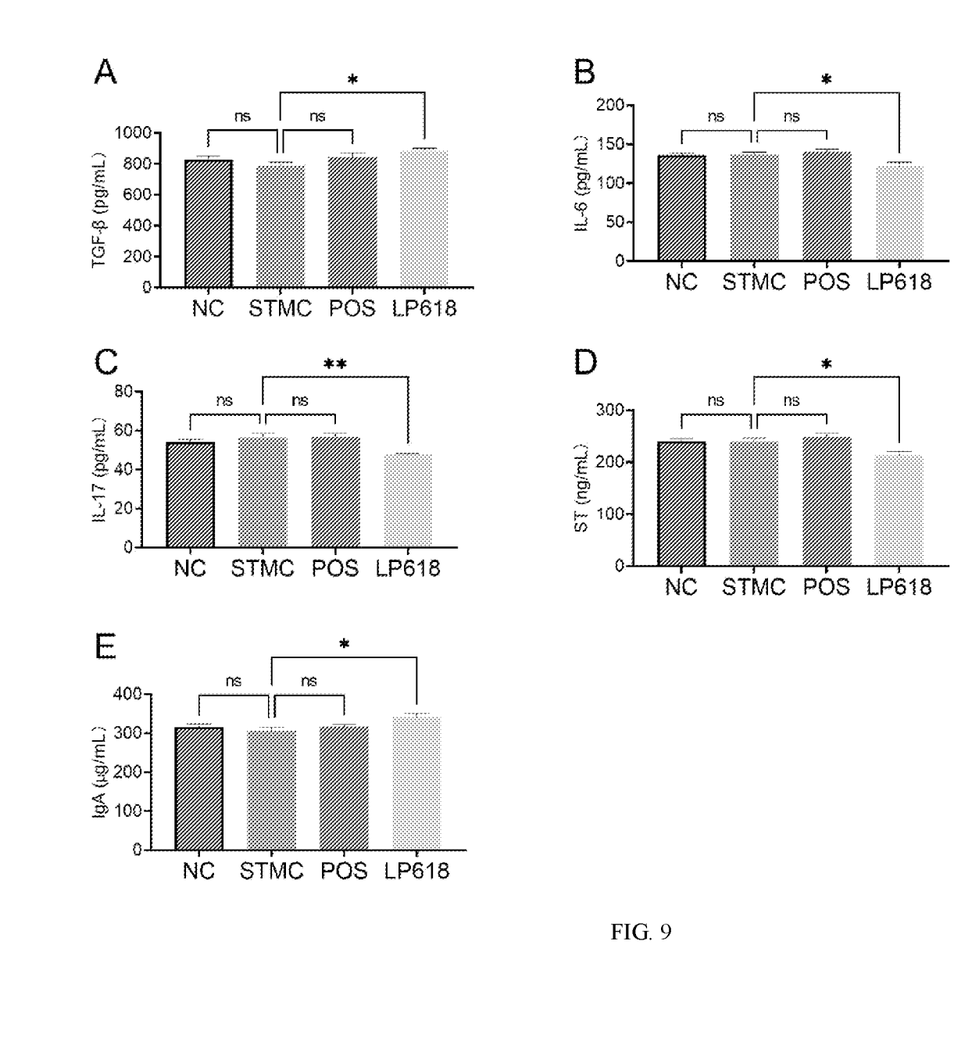
FIG. 9 shows the detection results of ELISA of serum cytokines in mice in embodiment 7 of the present invention; the error line represents the standard deviation; a statistical analysis method is a one-way ANOVA; ns represents that p value is greater than 0.05; * represents that p value is less than 0.05; and ** represents that p value is less than 0.01.

Mouse serum was taken for ELISA analysis, and the results were shown in FIG. 9. The content of TGF-$\beta$, as an immunosuppressive cytokine, was slightly decreased in the STMC group after the mice were infected with *Salmonella*, and significantly increased after the intervention of Lactiplantibacillus *plantarum* GOLDGUT-LP618 (A in FIG. 9). In addition, compared with the STMC model group, after the intervention of Lactiplantibacillus *plantarum* GOLDGUT-LP618, the contents of inflammatory factors IL-6 and IL-17 were significantly decreased (B and C in FIG. 9). The expression of serum ferritin (ST) was closely related to the infiltration of inflammatory cells. Compared with the STMC group, the ST content was significantly decreased after gavaging with Lactiplantibacillus *plantarum* GOLDGUT-LP618 (D in FIG. 9). Immunoglobulin A (IgA) can affect the immune response in the intestinal microenvironment. Compared with the STMC group, the IgA content in the intervention group of Lactiplantibacillus *plantarum* GOLDGUT-LP618 was significantly increased (E in FIG. 9).

To sum up, Lactiplantibacillus *plantarum* GOLDGUT-LP618 can alleviate intestinal inflammation induced by *Salmonella* infection by reducing the level of proinflammatory factors in serum, increasing the level of anti-inflammatory factors, reducing ST content and promoting the secretion of IgA.

Figure 10:
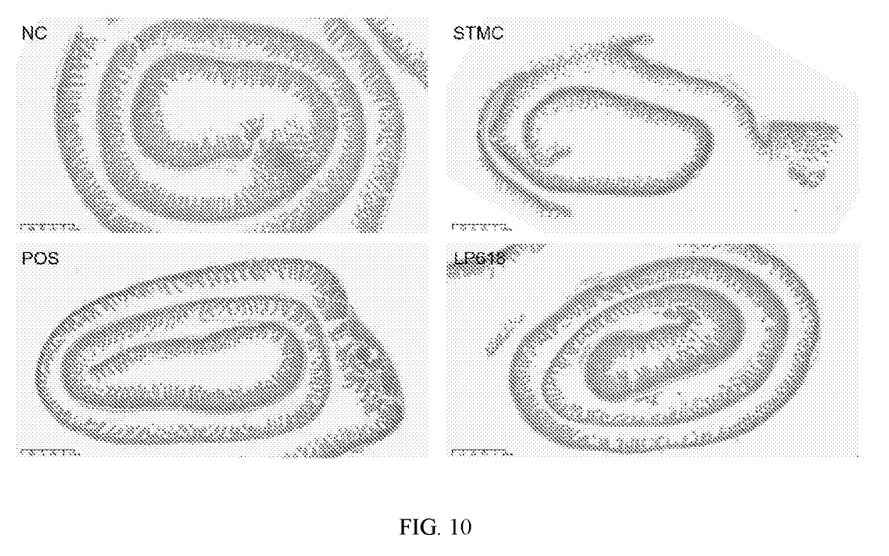
FIG. 10 shows the H&E staining diagram of the jejunum and ileum tissue of mice in embodiment 8 of the present invention, with a magnification of 40 times.

Embodiment 8 Protective Effect of Lactiplantibacillus *plantarum* GOLDGUT-LP618 on Intestinal Mucosa of Mice To assess whether Lactiplantibacillus *plantarum* GOLDGUT-LP618 improves the intestinal damage of the mice caused by infection with *Salmonella typhimurium*, the jejunum and ileum tissue was taken for tissue section and H&E staining analysis, and the results were shown in FIG. 10. In the NC group, the intestinal wall had no void and the *Lamina propria* structure was intact and normal; in the STMC group, the jejunal wall was thinner and had void and the *Lamina propria* structure was loose; intestinal villi became short and lost the normal shape; intestinal channels became wide and incomplete; and a few inflammatory cells were infiltrated. Compared with the model group, after the intervention of the positive drugs and the Lactiplantibacillus *plantarum* GOLD-GUT-LP618, the intestinal morphology was changed significantly; the intestinal tissue morphology was recovered to a certain extent; the length of the intestinal villi tended to be normal, and the structure was relatively complete. The void in the intestinal wall was restored; the *Lamina propria* structure was normal; the mucosa was intact; and the cells were not obviously infiltrated.

Figure 11:
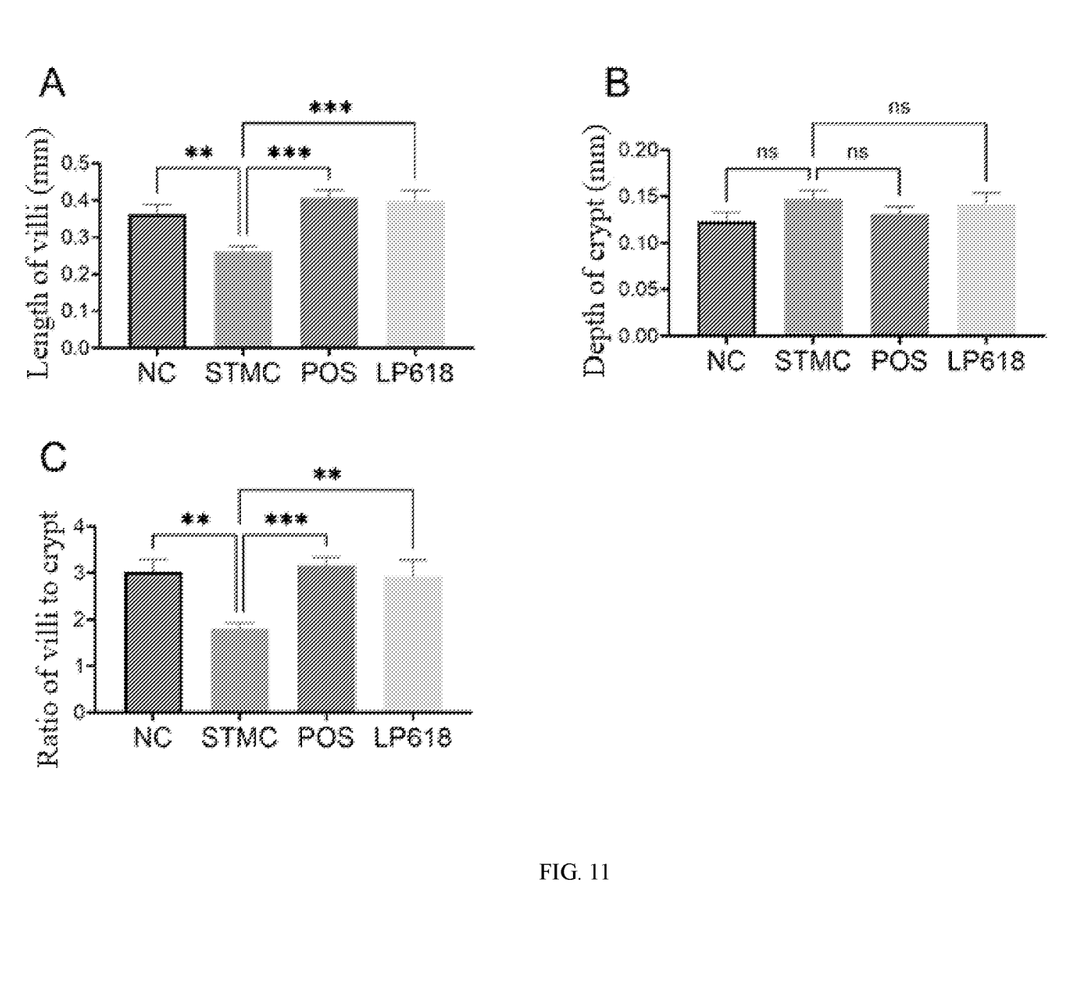
FIG. 11 shows the quantitative analysis results of villus length (A), crypt depth (B) and pile to crypt ratio (C) of jejuna and ilea of mice in embodiment 8 of the present invention; the error line represents the standard deviation; a statistical analysis method is a one-way ANOVA; ns represents that p value is greater than 0.05;  represents that p value is less than 0.01; and * represents that p value is less than 0.001.

The length of the villi, the depth of crypt and the ratio of the villi to the crypt were quantitatively analyzed, and the results were shown in FIG. 11. Compared with the NC group, after infection with *Salmonella* in the STMC group, the villus length of the jejunum was significantly reduced, and the depth of the crypt was not significantly increased, but the ratio of the villi to the crypt was significantly decreased, which indicated that *Salmonella* infection seriously damaged the intestinal structure and affected the structural integrity of the intestinal mucosa. Compared with the STMC group, the length of the intestinal villi and the ratio of the villi to the crypt were significantly increased in the positive drug group and the intervention of Lactiplantibacillus *plantarum* GOLDGUT-LP618. This indicates that the intervention of the Lactiplantibacillus *plantarum* GOLDGUT-LP618 can significantly promote villus development, improve intestinal health, and alleviate intestinal damage caused by *Salmonella* infection.

Embodiment 9) Increase of Content of Intestinal Short-Chain Fatty Acid in Mice by Lactiplantibacillus *plantarum* GOLDGUT-LP618

Figure 12:
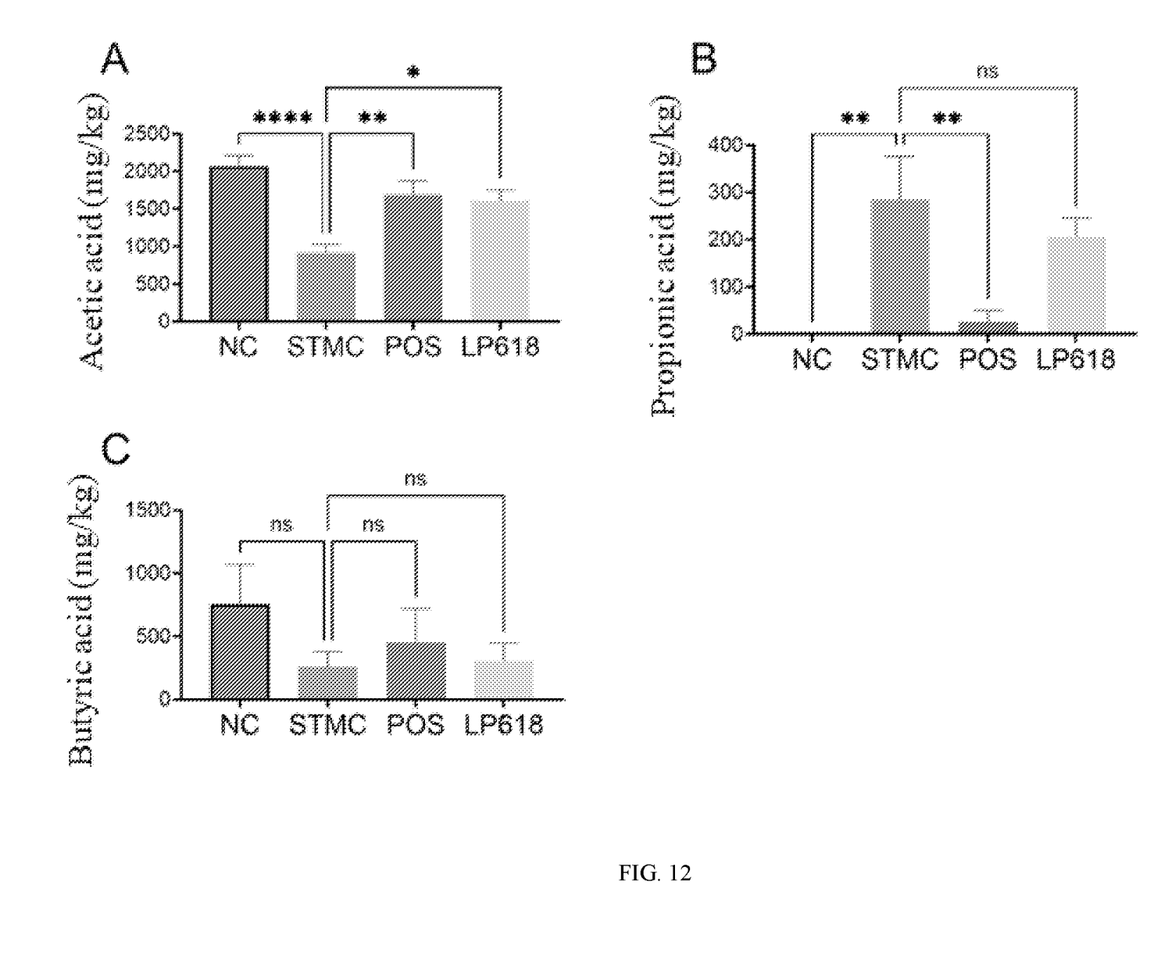
FIG. 12 shows the detection results of content of short-chain fatty acid in colon contents of mice in embodiment 9 of the present invention; the error line represents the standard deviation; a statistical analysis method is a one-way ANOVA; ns represents that p value is greater than 0.05; * represents that p value is less than 0.05;  represents that p value is less than 0.01; and ** represents that p value is less than 0.0001.

To verify whether the colonized Lactiplantibacillus *plantarum* GOLDGUT-LP618 increases the content of the intestinal short-chain fatty acid in mice, the short-chain fatty acid was detected from the colon contents of the mice. The results were shown in FIG. 12. Compared with the NC group, after infection with *Salmonella typhimurium*, the content of acetic acid in the STMC group was significantly decreased, the content of propionic acid was significantly increased, and the content of butyric acid was not significantly different. Compared with the STMC group, the intervention of the positive drug group and the Lactiplantibacillus *plantarum* GOLDGUT-LP618 significantly increased the content of acetic acid. Compared with the STMC group, the intervention of the Lactiplantibacillus *plantarum* GOLDGUT-LP618 did not change the content of propionic acid and butyric acid.

In conclusion, the present invention obtains a strain of Lactiplantibacillus *plantarum* through isolation and screening, and the strain is named Lactiplantibacillus *plantarum* GOLDGUT-LP618. The strain has good resistance to stomach acid and bile salt. The Lactiplantibacillus *plantarum* GOLDGUT-LP618 can produce short-chain fatty acid in vitro and in vivo. The Lactiplantibacillus *plantarum* GOLD-GUT-LP618 has the ability to inhibit *Salmonella* in vitro and can relieve diarrhea, intestinal inflammation and intestinal damage caused by *Salmonella typhimurium* in vivo. After the mice are infected with *Salmonella typhimurium*, colonized Lactiplantibacillus *plantarum* GOLDGUT-LP618 can improve the intestinal barrier, promote the intestinal health, and reduce diarrhea and inflammatory reaction. Therefore, the Lactiplantibacillus *plantarum* GOLDGUT-LP618 is a strain that can relieve the bacterial diarrhea caused by *Salmonella* infection and has anti-inflammatory function.

Finally, it should be noted that the above embodiments are only used to illustrate the technical solutions of the present invention, not to limit the technical solutions. Although the present invention is described in detail by referring to the above embodiments, those ordinary skilled in the art shall understand that the technical solutions recorded in the above embodiments can be still amended, or some technical features therein can be replaced equivalently. These amendments or replacements do not enable the essence of the corresponding technical solutions to depart from the spirit and the scope of the technical solutions in the embodiments of the present invention.

What is claimed is:

1. A method of preparing a microbial preparation for resisting *Salmonella* infection, wherein the microbial preparation comprising a Lactiplantibacillus *plantarum* GOLD-GUT-LP618 strain, which was deposited at the China General Microbiological Culture Collection Center (CGMCC), with a deposition number of CGMCC No. 28399;

wherein the method comprising steps:
(a) inoculating the Lactiplantibacillus *plantarum* GOLD-GUT-LP618 strain into an MRS liquid medium to form a mixture;
(b) incubating the mixture at 37° C. to obtain an enriched solution;
(c) performing a tenfold gradient on the enrichment solution to generate dilutions with gradient concentrations of $10^{-5}$, $10^{-6}$, and $10^{-7}$;
(d) applying 100 μL of each of the dilutions to sterile a first MRS solid medium and incubating under aerobic conditions at 37° C. for 24 to 48 hours, then single colonies are formed;
(e) selecting the single colonies; and
(f) repeatedly streaking the selected colonies on a second MRS solid medium for purification to obtain a purified strain.

* * * * *